United States Patent
Otung (10) Patent No.: US 9,049,135 B2
(45) Date of Patent: Jun. 2, 2015

(54) NETWORK SPARES AUDIT OPTIMIZATION AND MAINTENANCE SYSTEMS AND METHODS

(71) Applicant: CIENA CORPORATION, Hanover, MD (US)

(72) Inventor: Andikan Otung, London (GB)

(73) Assignee: Ciena Corporation, Hanover, MD (US)

( * ) Notice: Subject to any disclaimer, the term of this patent is extended or adjusted under 35 U.S.C. 154(b) by 190 days.

(21) Appl. No.: 13/647,918

(22) Filed: Oct. 9, 2012

(65) Prior Publication Data

US 2014/0098677 A1 Apr. 10, 2014

(51) Int. Cl.
*G01R 31/08* (2006.01)
*H04L 12/24* (2006.01)
*G06Q 10/08* (2012.01)

(52) U.S. Cl.
CPC .......... *H04L 41/145* (2013.01); *H04L 41/5019* (2013.01); *G06Q 10/0875* (2013.01)

(58) Field of Classification Search
USPC ................................................. 370/287, 375
See application file for complete search history.

(56) References Cited

U.S. PATENT DOCUMENTS

| | | | |
|---|---|---|---|
| 5,712,989 A | 1/1998 | Johnson et al. | |
| 5,748,098 A | 5/1998 | Grace | |
| 6,857,014 B1 | 2/2005 | Paterson et al. | |
| 7,996,284 B2 | 8/2011 | Bar et al. | |
| 2003/0101107 A1* | 5/2003 | Agarwal et al. | 705/28 |
| 2005/0071317 A1* | 3/2005 | Chandrashekhar et al. | 707/2 |
| 2007/0016496 A1 | 1/2007 | Bar et al. | |
| 2007/0152049 A1* | 7/2007 | Bar et al. | 235/385 |
| 2009/0279551 A1* | 11/2009 | Wong et al. | 370/395.53 |

\* cited by examiner

*Primary Examiner* — Jung-Jen Liu
(74) *Attorney, Agent, or Firm* — Clements Bernard PLLC; Christopher L. Bernard; Lawrence A. Baratta, Jr.

(57) ABSTRACT

A network spares audit, optimization, and maintenance system and method, including: an application running on a processor of one of (1) a network management system of a network and (2) a logistics management tool external to the network and in communication with the network management system of the network, the application including: a mapping algorithm executed by the application and operable for mapping network elements of one or more networks to spares depots; and a probabilistic risk analysis algorithm executed by the application and operable for utilizing statistical analysis to determine how many and what types of spares are stocked at each spares depot based on inputted conditions; wherein operation and output of the application is dynamically updated based on network configuration information automatically received from the network management system of the network.

19 Claims, 5 Drawing Sheets

NETWORK SPARES AUDIT OPTIMIZATION AND MAINTENANCE SYSTEMS AND METHODS

FIELD OF THE DISCLOSURE

The present disclosure relates generally to network systems and methods, such as optical network systems and methods. More specifically, the present disclosure relates to network spares audit, optimization, and maintenance systems and methods.

BACKGROUND OF THE DISCLOSURE

Once a network, such as an optical network, is deployed, the maintenance of service availability according to Service Level Agreements (SLAs) necessitates the storage of spare parts at the ready to service deployed parts following faults. However, for large and/or complex networks, the selection of the exact quantities of spares to store at particular depots can be complicated, especially for networks serviced by multiple depots.

Further, the assessment of the risk and cost associated with various spares configurations (which is important to align the selection of spares quantities with business objectives and strategies) is currently not available using a single tool. Thus, unreliable estimates and guesswork are required and routinely utilized. However, once risk levels are objectively quantified, informed judgments can be made concerning the trade-offs between the risk of spares depletion and the cost of mitigation.

Additionally, the task of assuring the correct levels of spares servicing a dynamic network is human-resource intensive and involves multiple manual procedures. Particularly, the monitoring of a network for changes in the requirements for spares is not presently automated.

The state-of-the-art procedure for determining the number of spares to place at each depot is manual and involves the selection of type and quantity of spares to place on an ad-hoc or 'rule of thumb' basis. The handling of placing spares for large and/or complex networks is carried out by an individual who may typically spend several weeks acquiring data and still, in the end, resort to guesswork in order to bolster spares holdings. Spares are normally purchased at the time of network build (for example, 3 spares for every 30 parts). However, the network can rapidly change and what may have previously been 30 spares for parts (SFPs) can quickly become more than 300 SFPs within the space of a year. The many individuals involved in the various aspects of providing spares for the network do not usually have a central repository to store data or new pieces of information, and so related information is usually multiple and in generally unknown locations.

Figure 1:
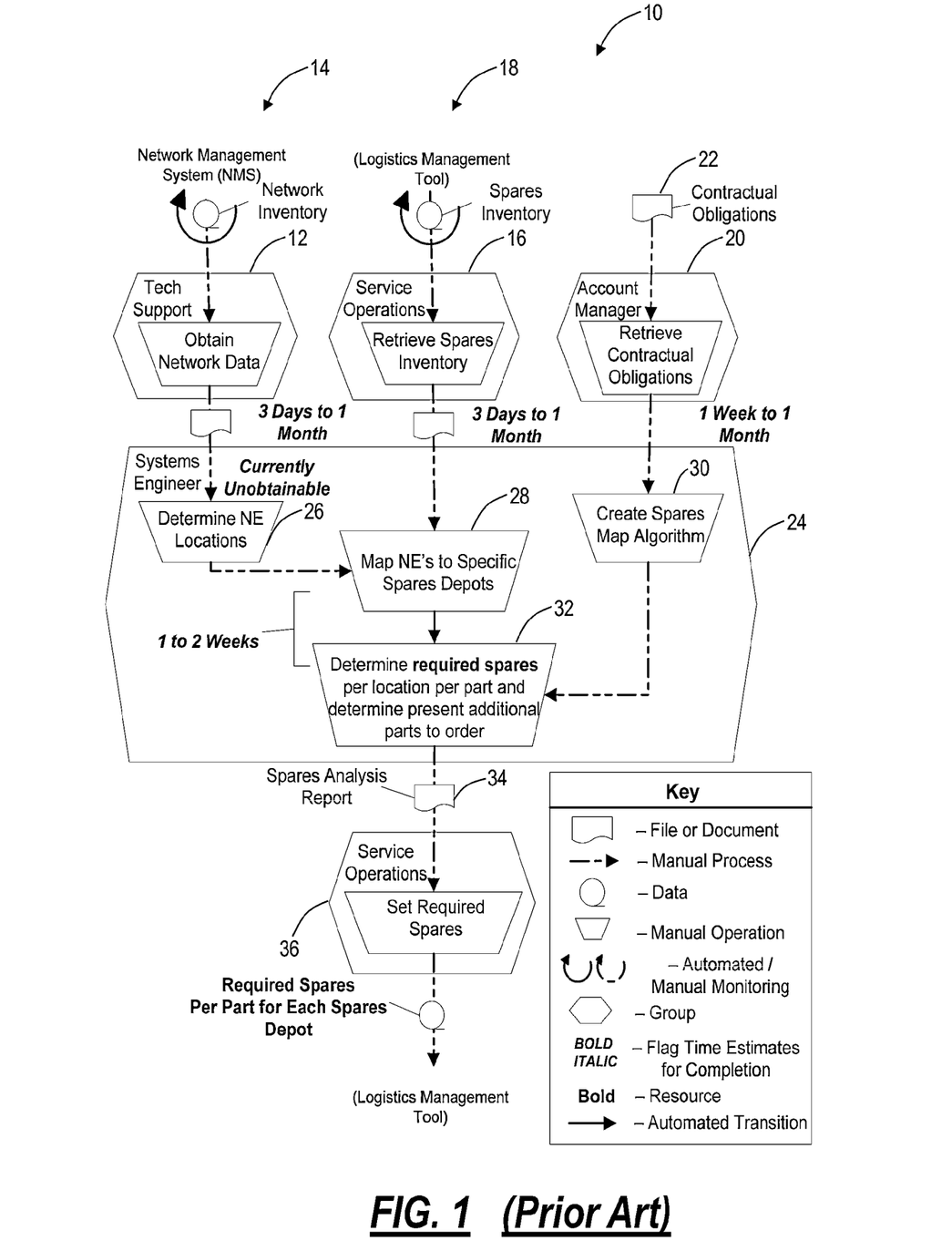
FIG. 1 is a schematic diagram illustrating a conventional spares requirement calculation process.

Referring specifically to FIG. 1, the state-of-the-art procedure 10 for determining the number of spares to place at each depot typically involves tech support 12 obtaining network data and network inventory from a Network Management System (NMS) 14, service operations 16 retrieving spares inventory from a Logistics Management Tool (LMT), and an account manager 20 retrieving contractual obligations 22, all of which can take from days to months. This information is then passed to a systems engineer 24, who determines Network Element (NE) locations 26, maps the NEs to specific spares depots 28, creates a spares map algorithm 30, and determines the required spares per location per part and determines the present additional parts to order 32, all of which can take weeks. The result is a spares analysis report 34 which is used by service operations 36 to set the required spares, which information is again passed to the LMT 38.

The shortcomings of this procedure include the following: there are no procedures in place to know whether SLAs are being kept; there is no way of knowing the actual coverage levels for networks served by multiple depots, therefore estimates are needed; there are too many manual or labor-intensive tasks; due to the durations and resources involved in completing a spares analysis, the process is completed annually and there could be extended periods of non-coverage following network upgrades; interdepartmental communication delays lead to increased analysis times; large manpower is required to complete a single analysis; following just one network upgrade, the whole process must be completed in order to know whether or how many more spares are needed; the notification of network changes for the process of spares management requires additional agreements and communications with the customer; tracking the location of each site requires additional and extensive communication with the customer; the management of important information, such as SLA requirements, spares algorithms, and the mapped location of NEs is difficult; and there are potential levels of spares coverage inconsistencies within large and/or complex networks serviced by multiple depots, as different systems engineers (in charge of different regions) may employ different algorithms.

Thus, the state-of-the-art procedure for the monitoring and recommendation of spares requirements is largely manual and especially difficult for large and/or complex networks, where recommendations are the result of rough estimates and best guesses. Moreover the risk associated with particular levels of spares is not currently quantified or even known, which does not facilitate objective business decision making regarding risk versus cost. For complex networks spanning multiple geographies or served by multiple spares depots, the analyses of what type and how many spares to place at particular depots becomes extremely difficult and prone to error. Such work typically spans multiple departments and functions, and is subject to low priority and communication delays. Following network changes, the calculation of the new requirements for network spares does not take place due to the complexity, lack of data, and extreme length of time required. Therefore, shortages in spares holdings are known only when a critical fault (that cannot be serviced by an available spare part) occurs; which can cost the party responsible thousands of dollars in SLA breaches. Further, over a period of several years, the tracking of contractual obligations or special arrangements can become difficult, as the original sales leads, negotiators, and/or systems engineer analyzers of spares may have moved to a different role or left a vendor.

BRIEF SUMMARY OF THE DISCLOSURE

The solution of the present disclosure is a Spares Audit, Optimization, and Maintenance Application (SAOMA) that maps network parts to storage depots in order to enable the determination (from Mean Time to Breakdown (MTTB) and Mean Time to Replace (MTTR) data) of the type and quantity of spares to place at specific depots and the level of risk and cost associated with various spares amounts, even for large and/or complex networks, such as optical networks.

The SAOMA leverages NMS capabilities to automatically monitor live network data in order to maintain the dynamic requirements for spares. Additionally, the SAOMA can communicate with LMTs to determine, from actual spares holdings, the near real-time risk of depletion of spares, produce Bills of Quantity (BoQs) where there is a deficit from required spares, and recommend spares optimizations for risk mitigation and/or for chosen risk-cost balances. In this regard, the SAOMA can run on a NMS, or can run on a LMT, both of which are in communication.

In one exemplary embodiment, the present disclosure provides a network spares audit, optimization, and maintenance system, including: an application running on a processor of one of (1) a network management system of a network and (2) a logistics management tool external to the network and in communication with the network management system of the network, the application including: a mapping algorithm executed by the application and operable for mapping network elements of one or more networks to spares depots; and a probabilistic risk analysis algorithm executed by the application and operable for utilizing statistical analysis to determine how many and what types of spares are stocked at each spares depot based on inputted conditions; wherein operation and output of the application is dynamically updated based on network configuration information automatically received from the network management system of the network. Optionally, mapping the network elements of the one or more networks to the spares depots includes first mapping the network elements of the one or more networks to sites and then mapping the sites to the spares depots. The application retrieves data from the logistics management tool external to the network and compares actual spares levels in the spares depots to required spares levels in the spares depots and flags any discrepancies prior to a fault occurring. The inputted conditions comprise one or more of contractual obligations, customer specified sparing algorithms, risks, risk limits, costs, cost limits, Mean Time to Breakdown data, Mean Time to Replace data, fault data, repair data, service interruption data, and network growth predictions, among other inputted conditions. The application monitors the one or more networks for configuration changes and, if detected, updates its sparing analyses. The network elements of the one or more networks are each mapped to one or more spares depots. The mapping algorithm is further operable for highlighting any network element that is not mapped to a spares depot. The probabilistic risk analysis algorithm is further operable for indicating a confidence interval within which a risk evaluation falls based on a standard deviation of one or more of Mean Time to Breakdown data and Mean Time to Replace data.

In another exemplary embodiment, the present disclosure provides a network spares audit, optimization, and maintenance method, including: providing an application running on a processor of one of (1) a network management system of a network and (2) a logistics management tool external to the network and in communication with the network management system of the network, the application including: a mapping algorithm executed by the application and operable for mapping network elements of one or more networks to spares depots; and a probabilistic risk analysis algorithm executed by the application and operable for utilizing statistical analysis to determine how many and what types of spares are stocked at each spares depot based on inputted conditions; wherein operation and output of the application is dynamically updated based on network configuration information automatically received from the network management system of the network. Optionally, mapping the network elements of the one or more networks to the spares depots includes first mapping the network elements of the one or more networks to sites and then mapping the sites to the spares depots. The application retrieves data from the logistics management tool external to the network and compares actual spares levels in the spares depots to required spares levels in the spares depots and flags any discrepancies prior to a fault occurring. The inputted conditions comprise one or more of contractual obligations, customer specified sparing algorithms, risks, risk limits, costs, cost limits, Mean Time to Breakdown data, Mean Time to Replace data, fault data, repair data, service interruption data, and network growth predictions, among other inputted conditions. The application monitors the one or more networks for configuration changes and, if detected, updates its sparing analyses. The network elements of the one or more networks are each mapped to one or more spares depots. The mapping algorithm is further operable for highlighting any network element that is not mapped to a spares depot. The probabilistic risk analysis algorithm is further operable for indicating a confidence interval within which a risk evaluation falls based on a standard deviation of one or more of Mean Time to Breakdown data and Mean Time to Replace data.

In a further exemplary embodiment, the present disclosure provides a network management system of a network, including: a network spares audit, optimization, and maintenance application running on an associated processor, the network spares audit, optimization, and maintenance application including: a mapping algorithm executed by the application and operable for mapping network elements of one or more networks to spares depots; and a probabilistic risk analysis algorithm executed by the application and operable for utilizing statistical analysis to determine how many and what types of spares are stocked at each spares depot based on inputted conditions; wherein operation and output of the application is dynamically updated based on network configuration information automatically received by the network management system of the network; and wherein the network management system of the network is in communication with a logistics management tool external to the network. Optionally, mapping the network elements of the one or more networks to the spares depots includes first mapping the network elements of the one or more networks to sites and then mapping the sites to the spares depots. The application retrieves data from the logistics management tool external to the network and compares actual spares levels in the spares depots to required spares levels in the spares depots and flags any discrepancies prior to a fault occurring. The inputted conditions comprise one or more of contractual obligations, customer specified sparing algorithms, risks, risk limits, costs, cost limits, Mean Time to Breakdown data, Mean Time to Replace data, fault data, repair data, service interruption data, and network growth predictions, among other inputted conditions. The application monitors the one or more networks for configuration changes and, if detected, updates its sparing analyses. The network elements of the one or more networks are each mapped to one or more spares depots.

It should be noted that, under a vendor managed spares arrangement (where the vendor monitors and manages the customer's spares) the benefits include:

- reduced spares calculation times (from months to minutes), reduced risk of warehouse depletion;
- elimination of manual tasks, reduced workforce demands;
- automatic network monitoring and calculation to BoQ generation, more streamlined and efficient business processes;
- active notification of new spares requirements and automatic real-time assessments of risk, reduced possibility of SLA breach;
- all relevant information is accessible from single location, reduced staff training time and cost, faster access for objective decision making;
- repeatability, possible to quickly repeat analyses;

mapping of spares to storage sites—handles complexities for large and/or complex networks;

user assistance to handle whole process, staff turnover survivability; and accuracy and consistency of analyses over whole network (especially a large network).

However, under a non-vendor managed spares arrangement, where a customer is responsible for managing their own spares, the SAOMA can be licensed to the customer so that the customer receives all the above benefits. The benefit in this case to the vendor is:

new revenue streams, improved reputation, credibility, brand, image; and larger portfolio of solutions.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 2:
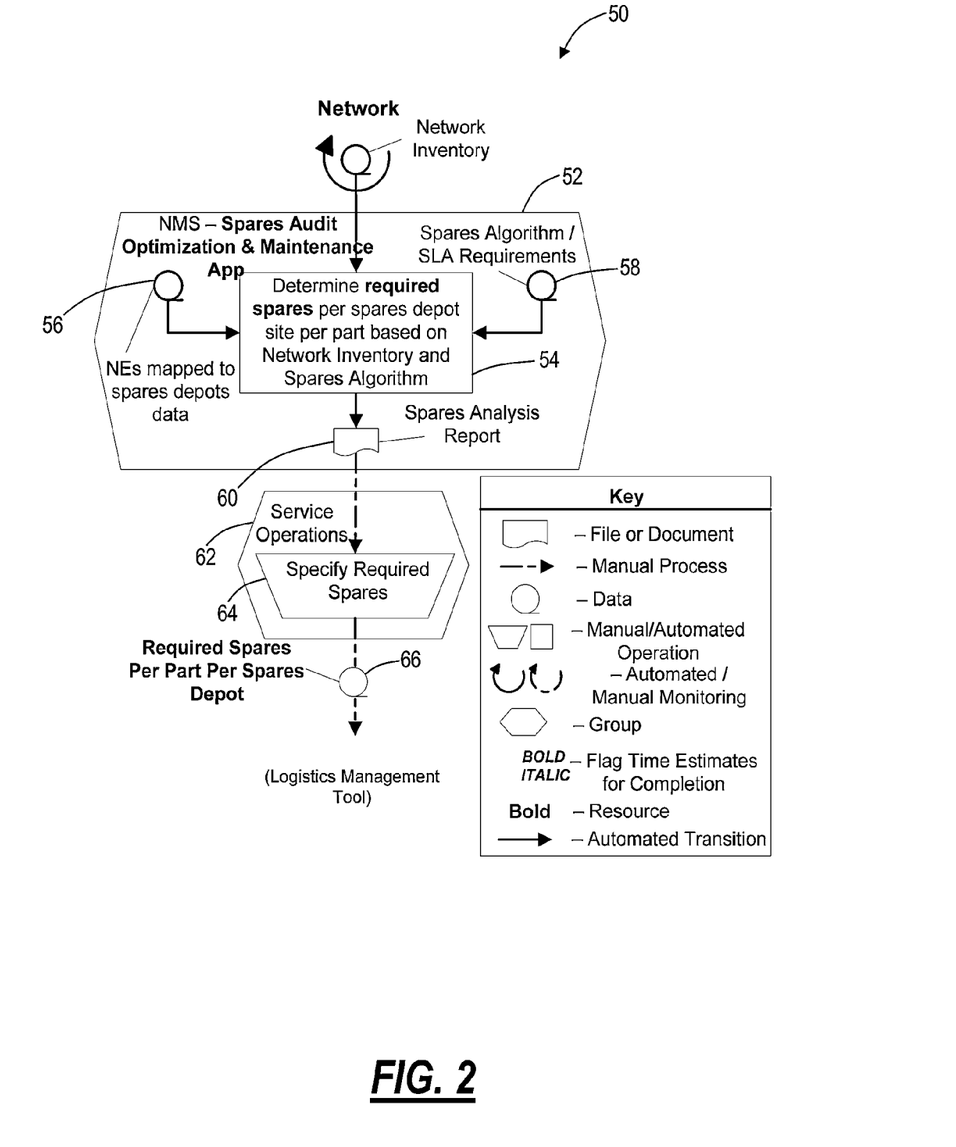
FIG. 2 is a schematic diagram illustrating one exemplary embodiment of the spares requirement calculation process of the present disclosure, utilizing the SAOMA.

Referring specifically to FIG. 2, the procedure 50 for determining the number of spares to place at each depot of the present disclosure utilizes the SAOMA 52 operating on a NMS, or, optionally, operating on a LMT in communication with the NMS. The SAOMA 52 determines the required spares per spares depot site per part based on a Network Inventory and Spares Algorithm (NISA) 54, as described in greater detail herein below. The NISA utilizes data regarding the mapping of the NEs to spares depot sites 56 and a spares algorithm and SLA requirements data 58. The output is a spares analysis report 60 that is utilized by service operations 62 to specify required spares 64. The required spares per spares depot site per part 66 is then utilized by the LMT.

The SAOMA 52 automates the calculation of spares requirements based on preconfigured preferences. The SAOMA 52 also considers the risk of spares depletion associated with each type of part at each depot using the formula:

$$P_r(x_{crit}, N_P, T_R) = \sum_{x=x_{crit}}^{N_P} (P_F\langle 0|T_R\rangle)^x \times (1 - P_F\langle 0|T_R\rangle)^{(N_P-x)} \times \frac{N_P!}{x!(N_p-x)!}$$

This allows for the known reliability or risk of selections.

The SAOMA 52 allows for NEs to be mapped to particular spares depots. The calculation of the number of spares required can then be automatically carried out via a user-approved algorithm to handle the complexity of large or geographically diverse networks and to reduce the chance of human error on the calculations.

The SAOMA 52 monitors live network data from the NMS in order to dynamically calculate changes in sparing requirements. Further, the SAOMA 52 retrieves data from LMTs in order to compare actual holdings with required holdings to flag shortages to a user or recommend optimizations of spares. This avoids notification via critical failures or SLA breaches, for example.

The SAOMA 52 forms a central access point for all relevant information regarding spares holdings. This includes, for example, contractual obligations, customer-specified algorithms, costs, risks, price MTTB and MTTR information, etc. Thus, the loss of information through staff turnover or the like is avoided.

An important aspect of the present disclosure is the utilization of a combination of live network data, along with reliability, geographical, logistics, and cost information; and the automation of the related analysis using customizable risk mitigation algorithms to yield optimum risk/cost balance of spares holdings at regional depots.

The analysis utilizes a geographical mapping algorithm, coupled with a probabilistic risk analysis algorithm, and leverages network discovery technologies already available on the NMS to gain an accurate picture of the network equipping per site. This data is augmented with manufacturer MTTB data and operator MTTR refinement data to gain a view of the probability of specific failures per site, as well as to assess the risk of warehouse depletion. Data on operator MTTR targets and per fault type repair data is then processed to determine viable spares distance and to identify the amount of equipment each item of spares supports. The solution provides information on the risk of spares exhaustion for each equipment type at each depot and indicates risk aversion through additional equipment. The solution uses equipment price data to provide a view of the cost of risk reduction and proposes an optimum cost balance by evaluating the average cost of MTTR targets being exceeded.

The analysis can be extended to account more precisely for the service impact of any failure, so as to provide refinements to the risk figures as the value of services passing through particular sites vary and propose adjustments to the spares holdings to maintain chosen risk levels.

The analysis can also be extended to account for live network failures and fault location information to identify the appropriate spares depot for a maintenance crew to either acquire the spare for a necessary repair or to follow up restocking the local exchange after the repair.

The analysis can further be extended using predictions related to network growth and service deployments to provide a projection of spares holding requirements to maintain the chosen risk levels associated with ongoing equipment purchases.

Again, the solution of the present disclosure can be packaged with planning systems, NMSs, and/or LMTs. It should be noted, however, that a simple LMT is not described. The involvement of LMTs with spares includes tracking the physical movement of spares and potentially monitoring spares at the storage depot. However, such LMTs do not map live network data to depots to determine from MTTB and/or MTTR information and/or the like the number of particular spares at each storage depot required in order to contractually maintain service availability with selected levels of risk, and calculated degrees of certainty. Moreover, the specific use of live network data means that, as the network grows, new requirements (for spares) due to the changed network, can be calculated effectively and efficiently.

Likewise, this is not a stocking-level tool that would be used by online retailers, for example. Such tools work on and with a completely different set of parameters. For example, turnover cycles of stock and stock value and storage capacity could be possible parameters. However, in accordance with the systems and methods of the present disclosure, there is live network to monitor, for example, with NE locations mapped to storage depots and possible MTTB rates to consider.

Further, this is not a generic sparing functionality that could be provided by a LMT in other industries, such as utilities, manufacturing, rentals, etc. The dynamic nature of the telecommunications industry, and, moreover, the need for high service availability, generates the need for a (responsive) dynamic tool that can monitor large and/or complex networks (with elements potentially spanning multiple geographies, or in remote locations where spares cannot be placed, therefore the need to be mapped to other locations).

Still further, this is not a simple extension of the functionality of a network planning tool that could plan for spares based on future planned or predicted network specifications details. The application of the present disclosure involves the real-time monitoring of live network data and requirements in order to dynamically recommend levels of spares in detail. This approach allows for provider flexibility in the deployment of new service equipment and introduction of new technology as a network is actively and automatically monitored for changes in spares requirements to facilitate known (or selected) levels of risk.

As described above, the process of the present disclosure is highly automated from beginning to end. Fundamental to this level of automation, is the SAOMA running on or in communication with the vendor's NMS. As shown, the relevant data necessary for the calculation of spares is placed directly on the SAOMA, which then monitors the network for changes and automatically generates the Spares Analysis Report containing the required spares at each storage depot on a per part basis. It is important to note that, once the requirements have been placed onto the SAOMA, the manual tasks for systems engineers, service operations, account management, and tech support are essentially eliminated.

Referring to the shortcomings of conventional processes, described above, the process of the present disclosure solves them all: there are no procedures in place to know whether SLAs are being kept (SLAs are used to generate the spares calculation algorithm once, and are then autonomously monitored by the SAOMA for compliance); there is no way of knowing the actual coverage levels for networks served by multiple depots, therefore estimates are needed (NEs are conveniently mapped to particular depots on the SAOMA upon NE addition); there are too many manual or labor-intensive tasks (the SAOMA is automated); due to the durations and resources involved in completing a spares analysis, the process is completed annually and there could be extended periods of non-coverage following network upgrades (calculation times are significantly reduced by the SAOMA); interdepartmental communication delays lead to increased analysis times (all underlying data is readily retrievable through the SAOMA); large manpower is required to complete a single analysis (the SAOMA on the NMS provides complete end-to-end automation of the analysis process); following just one network upgrade, the whole process must be completed in order to know whether or how many more spares are needed (placing the SAOMA on the NMS leverages existing automated link discovery protocols and produces instantaneous notification of and adaptation to changes); the notification of network changes for the process of spares management requires additional agreements and communications with the customer (again, SLAs are used to generate the spares calculation algorithm once, and are then autonomously monitored by the SAOMA for compliance); tracking the location of each site requires additional and extensive communication with the customer (again, all underlying data is readily retrievable through the SAOMA); the management of important information, such as SLA requirements, spares algorithms, and the mapped location of NEs is difficult (again, the SAOMA is automated); and there are potential levels of spares coverage inconsistencies within large and/or complex networks serviced by multiple depots, as different systems engineers (in charge of different regions) may employ different algorithms (the SAOMA provides a centralized, unified, and consistent algorithm for spares calculations). In general, the SAOMA does in minutes what previously took months and teams of people to do.

As an example of the systems and methods of the present disclosure, a telecom service provider purchased a 140 node network with 30 types of (spare-able) parts totaling 1000 parts. Spares for the network are stored in 3 geographically separated locations to allow for spares to be transferred from storage to network sites within contractual obligation times. Upon initial network build, 30 spare parts were bought in order to service faults in accordance with a policy of a minimum of 3% spares coverage for each part.

Figure 3:
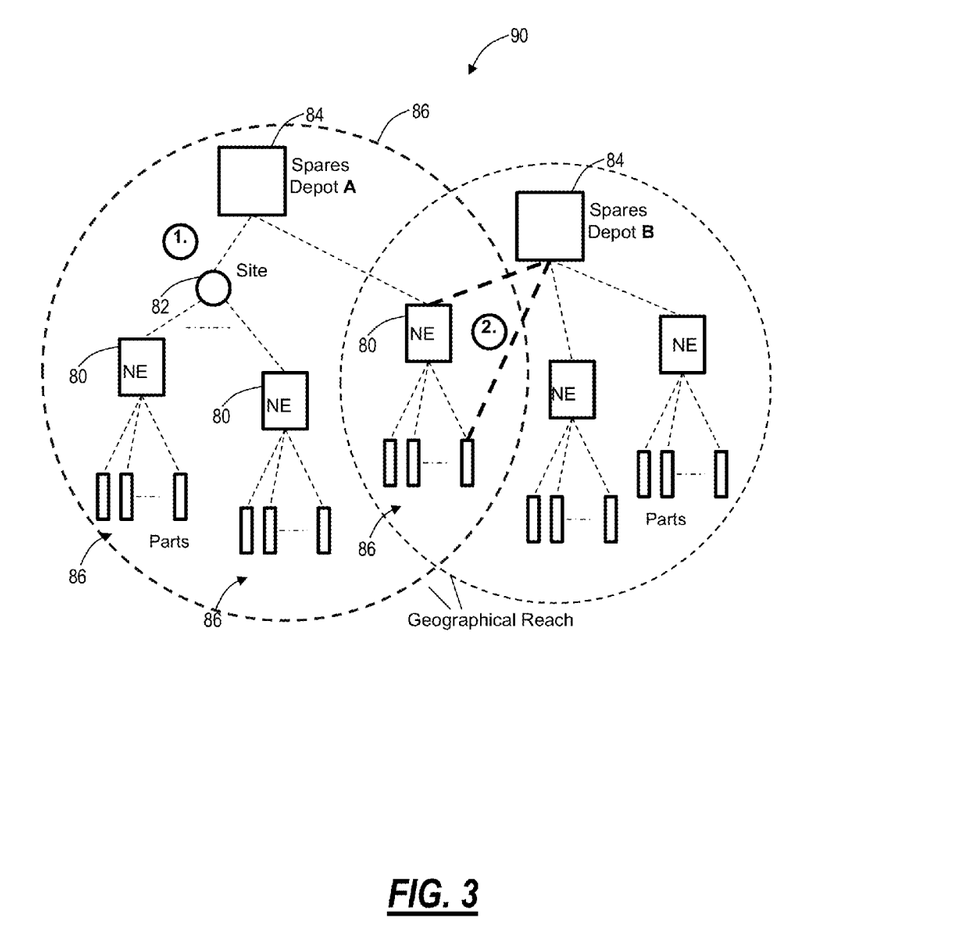
FIG. 3 is a schematic diagram illustrating one exemplary embodiment of a spares mapping process of the present disclosure, utilizing the SAOMA.

Following the network build, the service provider network operations team employs the SAOMA. Referring specifically to FIG. 3, the SAOMA allows for NEs 80 to be grouped to sites 82 (1) and mapped to particular spares depots 84. Once each NE 80 is mapped, all parts within the NE 80 can automatically be assigned to each depot 84. The allocation of NEs 80 can be conducted automatically on a geographical basis 86 or can be user-specified. For greater flexibility, to optimize spares quantities at each depot 84, each NE part 88 or site 82 can be mapped to multiple storage depots 84 (2) and parts within NEs 80 can be mapped to different depots 84.

The mapping process 90 produces a list of part codes and quantities for each storage depot 84 to be considered for spares. The service provider network operations team then specifies the algorithm to determine spares, which could be (but is not limited to) one of the following:
- spares determined based on a fixed and/or percentage basis;
- based on a probability and/or risk management basis;
- based on MTTB, MTTR, and/or MTBF; and/or algorithms could also be implemented in bands (1-3:1, 4-10:1+5%, >11:1+4%, etc.)

In the present example, the policy requires a minimum of 3% spares, therefore a percentage of 3 with minimum of 1 spare for parts could be used.

Once the spares level is chosen for each part, the SAOMA then calculates certain performance statistics, such as the probability or risk of critical or unserviceable faults (where failed parts are unable to be replaced by available spares). For each part in the network, the risk that a critical number of part failures mapped to the spares depot can be given as:

$$P_r(x_{crit}, N_P, T_R) = \sum_{x=x_{crit}}^{N_P} (P_F \langle 0 | T_R \rangle)^x \times (1 - P_F \langle 0 | T_R \rangle)^{(N_P - x)} \times \frac{N_P!}{x!(N_p - x)!}$$

where $X_{crit}$—is 1 plus the number of spares in holding;
$N_P$—is the number of parts considered;

$P_F\langle 0|T_R\rangle$—is the probability of failure of a part within the specified time period; and $T_R$—is the mean time to replace.

This can calculated for S depots with z(s) types of parts mapped as:

$$P_r(x_{crit}(z(s)), N_P(z(s)), T_R(z(s)), Z(s), S) =$$
$$1 - \prod_{s=1}^{S} (1 - P_r(x_{crit}(z(s)), N_P(z(s)), T_R(z(s)), Z(s)))$$

This is the risk of critical failures across the whole network.

Based on these calculations, the service provider network operations team would then decide whether more spares are needed for various part types (perhaps with faster MTTBs or longer MTTRs), in addition to the policy minimum requirement of 3%.

The SAOMA, resident in the NMS, would directly connect to the LMT used by a service provider to retrieve information regarding the actual number of spares held at each storage site for the network. Once the information is analyzed, the tool would then flag shortages of spares and possibly excess spares and produce a bill of materials for the shortages and recommend optimization (i.e. the shifting of spares) where there may be excess (which could be done with respect to risk and/or cost mitigation).

As the network grows (i.e. parts are added), the likelihood of faults increases and, vice versa, as parts are taken out, the likelihood of faults decreases. Therefore, the SAOMA would monitor the service provider's network for changes and automatically calculate new spares requirements. Once changes to the spares requirements occur, the SAOMA would notify the service provider network operations team to initiate the process of acquiring more spares. A bill of materials or purchase orders could also be produced automatically and sent to the service provider's supplier(s). Should storage sites change, the tool would be able to accommodate for this by allowing the easy transfer of mapped parts to whichever site is available.

Empirical data related to live network data is captured to fine tune performance evaluations, where the average and standard deviation of the following types of data can be improved:

Mean Time To Breakdown;
Mean Time To Repair; and/or
Mean Time To Replace Spares at spares depots, etc.

In terms of derivations, the probability of x failures of $N_p$ parts is given by:

$$P_r(x, N_P) = P_F^x \times (1 - P_F)^{(N_P - x)} \times \frac{N_P!}{x!(N_p - x)!}$$

where $P_F$ is the probability of failure of a single part; and the failure rate is assumed to be equal for all $N_p$ parts.

The probability of failure, $P_F$, of a single part can be calculated from part failure rates, $R_F$, which can be estimated from MTTB ($T_B$) using:

$$R_F = \frac{1}{2T_B}$$

(because over the period of time $T_B$, it is expected that 50% of the parts would have failed).

Therefore, the number of failures expected over a time period T is given by:

$$n_F\langle 0|T\rangle = ceil\{T \times R_F \times N_P\}$$

(provided that a consistent unit of time is used for all variables) and the probability of a failure of an individual part over a period of time T can be estimated as:

$$P_F\langle 0|T\rangle = T \times R_F$$

where $N_p = 1$ and $T \leq 2T_B$, or for multiple parts, $T < 2N_p T_B$.

Therefore, the probability of x failures of $N_p$ parts over a given period of time T (or $\langle 0|T\rangle$) is given by:

$$P_r(x, N_P, T) = (P_F\langle 0|T\rangle)^x \times (1 - P_F\langle 0|T\rangle)^{(N_P - x)} \times \frac{N_P!}{x!(N_p - x)!}$$

where $P_F$ lies strictly between 0 and 1 and can be approximated as $P_F = T/2T_B$. For $P_F$ approximation considerations for greater time periods these equations may be extended, as described in greater detail herein below.

If n parts are held in storage, then should n part failures occur within the mean time to replace $T_R$ spares at the storage depot, then the depot would be depleted of spares, and should an additional part failure occur (i.e. n+1 in total), there would be no more spares available to service the fault. Therefore, the critical number of faults can be defined as $x_{crit} = n+1$.

Therefore, the probability of at least the critical number of faults occurring within the mean time to replace, $T_R$, can be given as:

$$P_r(x_{crit}, N_P, T_R) =$$
$$\sum_{x=x_{crit}}^{N_P} (P_F\langle 0|T_R\rangle)^x \times (1 - P_F\langle 0|T_R\rangle)^{(N_P - x)} \times \frac{N_P!}{x!(N_R - x)!}$$

where the probability of a part failure is given for a certain time period, $T_R$, as:

$$P_F\langle 0|T_R\rangle = T_R \times R_F = \frac{T_R}{2T_B}$$

or, alternatively $$P_r(x_{crit}, N_p, T_R) =$$
$$\sum_{x=0}^{x_{crit}-1} \left( (P_F\langle 0|T_R\rangle)^x \times (1 - P_F\langle 0|T_R\rangle)^{(N_P - x)} \times \frac{N_P!}{x!(N_p - x)!} \right)$$

which offers faster convergence through the summation over a smaller range.

For Z types of parts in the network mapped to a single storage depot, the probability of at least one critical failure can be calculated as:

$$P_r(x_{crit}(z), N_{P(z)}, T_R(z), Z) =$$

-continued $$1 - \prod_{z=1}^{Z}\left(1 - \sum_{x=x_{crit}(z)}^{N_P(z)} (P_F\langle 0 | T_R(z)\rangle)^x \times (1 - P_F\langle 0 | T_R(z)\rangle)^{(N_P(z)-x)} \times \frac{N_P(z)!}{x!(N_P(z)-x)!}\right)$$

Therefore, for S storage depots, with Z(s) types of network parts mapped to each, the probability of critical part failure for the whole network can be given by:

$$P_r(x_{crit}(z(s)), N_P(z(s)), T_R(z(s)), Z(s), S) =$$

$$1 - \prod_{s=1}^{S}(1 - P_r(x_{crit}(z(s)), N_P(z(s)), T_R(z(s)), Z(s)))$$

which represents a reliable risk figure of critical failure over the whole network.

The equation can be extended to include or consider the possibility of multiple sets of $x_{crit}$ failures over a given period of time, or the possibility of multiple failures of a single part within the given time period. Further equation extensions could consider the risk (probability figure) of failure over multiple separate networks. Also, the probability of failure of a single part can be approximated by the sigmoid function $P_F(x)=1/(1+e^{-(ax+b)})$ shifted to where $P_F(T_B)=0.5$, where $T_B$ is the mean time to breakdown. The approach allows the approximation of probabilities of failure for time periods greater than $T_B$.

Additionally, if the standard deviation, $\sigma_{TB}$, of $T_B$, and the standard deviation, $\sigma_{TR}$, of $T_R$ (the equation inputs) are known, then they can be used to implement confidence intervals for a given probability calculation, where for a set of data the probability of the failure of a part over time period T becomes:

$$P_F\langle 0 | T_R\rangle = \frac{(T_R \pm \varphi_R)}{2 \times (T_B \pm \varphi_B)}$$

For various values of $\phi_R$ and $\phi_T$, a spread range of probabilities can be determined that lie within a certain range of confidence (i.e. confidence intervals), as illustrated in the table below:

| $\phi_R$ | $\phi_B$ | Confidence/% |
| --- | --- | --- |
| $\sigma_{TR}$ | $\sigma_{TB}$ | 68.2 |
| 2 × $\sigma_{TR}$ | 2 × $\sigma_{TB}$ | 95.4 |
| 3 × $\sigma_{TR}$ | 3 × $\sigma_{TB}$ | 99.7 |

The expected variation of $T_R$ and $T_B$ is assumed to be normally distributed.

Figure 4:
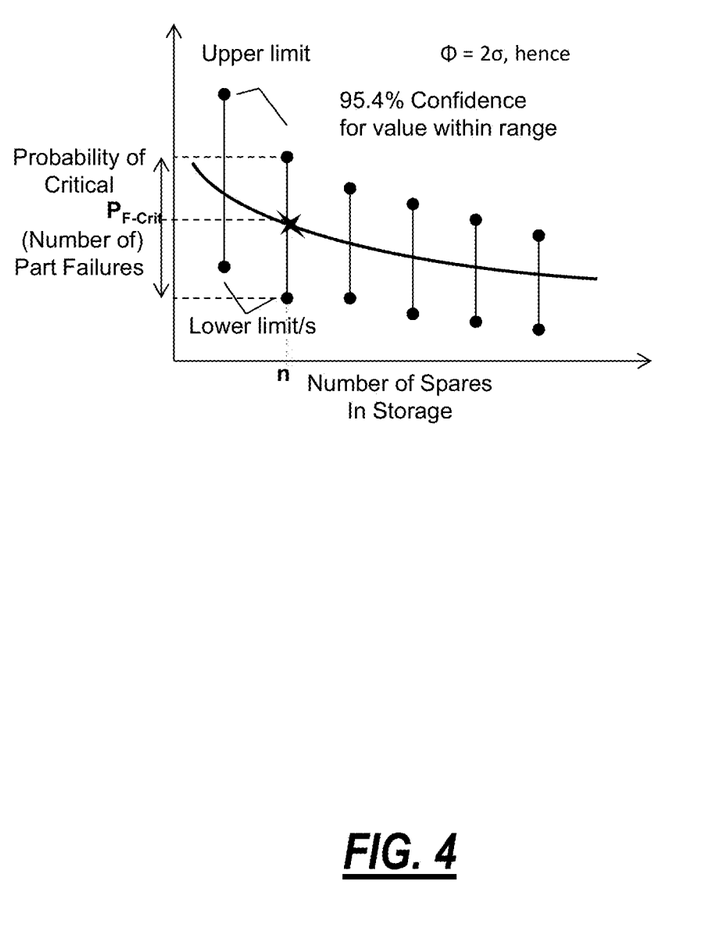
FIG. 4 is a plot of storage spares versus risk of critical failures generated utilizing the SAOMA.

The expected output of storage spares versus risk of critical failures is provided in FIG. 4, where the application of plus or minus φ produces a range of probabilities for each plot. For the case illustrated, φ was selected as 2×σ, implying a 95.5% confidence that the actual probability of critical part failures lies within the ranges calculated.

In summary, the SAOMA has the following features, applications, and extensions:

Ability to recommend specific numbers of spares for each part code at each spares depot location based on the network size primarily;
Mean Time To Breakdown/Repair (MTTB/R);
Virtual capacity limitations of storage sites;
Location of NEs at storage sites;
Desired levels of risk;
1+1, site based, probability distribution based;
Replacement cost of parts to various locations;
Ability to automatically detect network changes and recommend new levels of spares requirements;
Ability to notify automatically of changes to spares requirements;
Ability to group NEs in sites and map NEs or sites to Storage depots;
Ability to map NEs to multiple sites. This allows for flexibility to optimize levels of storage in sites;
The ability to map parts within NEs to multiple storage depots;
Ability to limit or assign weights to storage capacity of storage sites;
Ability to automatically map NEs to storage depots (to assist user);
based on the following input data;
GPS coordinates;
Postcode;
IP address;
City;
Adjacent NEs for estimates;
where distanced-based mapping could be considered with virtual distance adjustments from possible;
Replacement cost (to boost service efficiency);
Replacement time (to boost network survivability);
Ability to consider the potential replacement of a part version 1 by the later release of that part version 2, where both parts may be available for spares, and where the replacement of version 2 with version 1 may not be viable/feasible. Even though the replacement for version 1 with version 2 may be viable;
Ability to electronically, systematically, and automatically communicate with logistics management or planning tools in order to;
retrieve information on spares and depot sites, for assistance in the mapping process of network sites to spares depots;
transfer or upload specific spares recommendation levels for each part per storage depot;
retrieve information on the number of spares held in each storage depot in order to calculate and flag to the user;
Additional spares required;
Excess numbers of spares at depots;
Potential optimization options to redistribute spares based on risk;
Generate BoQ's or PO's based on the deficit between the required and actual spares holdings;
Ability to rate or assess availability performance (failure survivability) of various levels of spares based on statistical analyses of recommendation spares levels or actual spares levels retrieved from an interoperable logistics management tool, where each assessment could be calculated following a fault or shipment of various parts from each depot;
Ability to assess risk of unserviceable part failures in the whole network, and assign a numerical value for each part;

Ability to assess uncertainty of data in order to determine risk, where uncertainty would rise through lack of information provided to the tool;
For example, unknown MTTB/R rates;
Unknown part/NE locations or assigned replacement costs;
Or even intervals between analyses of spares could raise risk analysis uncertainty as the network may have changed since previous analyses; and
Ability to extract information from other networks in order to recommend specific spares requirement levels for those networks as well with associated levels of risk, uncertainty, and availability metrics involved, with potential for functionality on a near-real-time basis.

Figure 5:
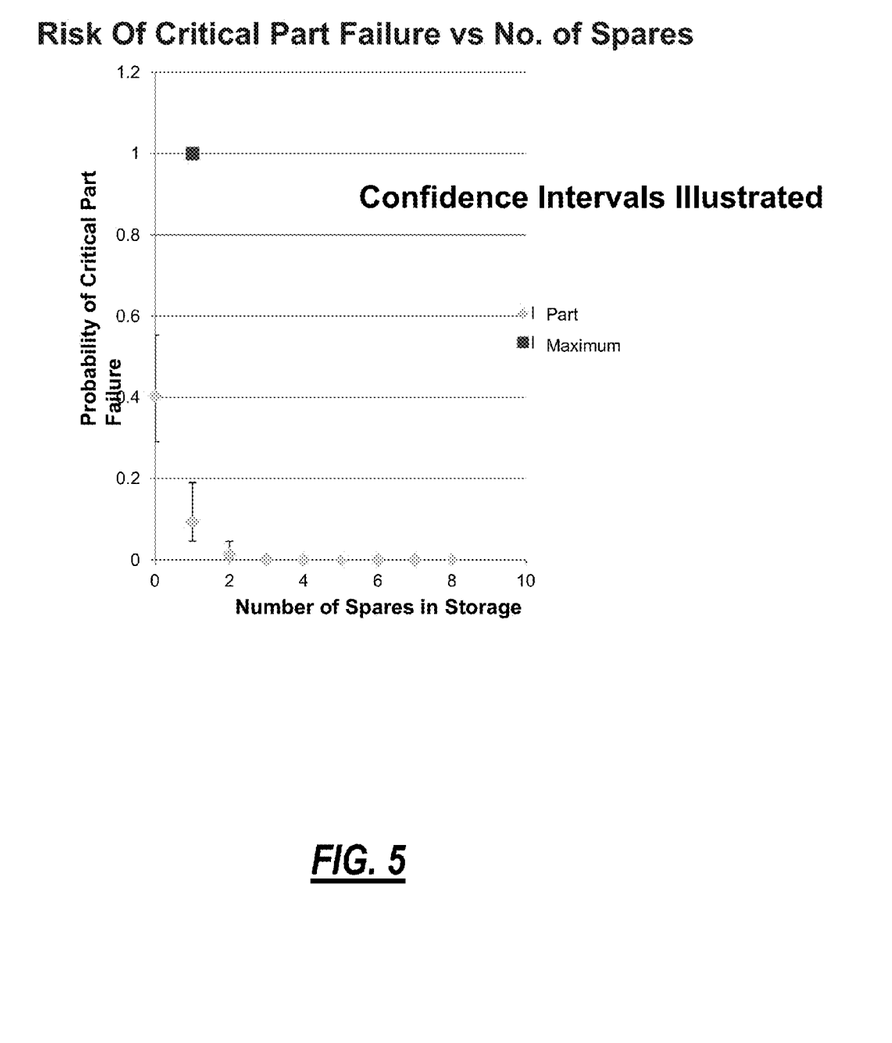
FIG. 5 is a plot of risk versus number of spares for a network part with an arbitrary 5-year MTTB.

FIG. 5 is a plot of risk versus number of spares for a network part with an arbitrary 5-year MTTB, as an exemplary result of the systems and methods of the present disclosure.

It will be appreciated by those of ordinary skill in the art that some exemplary embodiments described herein may include one or more generic or specialized processors, such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the systems and/or methods described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc., each of which may include a processor to perform methods as described and claimed herein. Examples of such computer-readable storage media include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network spares audit, optimization, and maintenance system, comprising:
a processor configured to execute an application, the processor associated with one of (1) a network management system of a network and (2) a logistics management tool external to the network and in communication with the network management system of the network, wherein the network management system performs network discovery and provides the application with live network data related to equipment present at each site in the network in real time, the application comprising:
a probabilistic risk analysis algorithm executed by the application and operable to utilize statistical analysis to determine how many and what types of spares are required at each of one or more spares depots based on inputted conditions, the live network data, and network configuration information; and
a mapping algorithm operable to map the equipment of the network to the one or more spares depots, and wherein the equipment is mapped to the one or more spares depots by first mapping the equipment to sites and then mapping the sites to the one or more spares depots;
wherein the application is configured to provide one or more of a notification of new spares requirements and an assessment of risks based on newly added equipment detected in the live network data.

2. The network spares audit, optimization, and maintenance system of claim 1, wherein the application compares actual spares levels in the spares depots to required spares levels in the spares depots and flags any discrepancies prior to a fault occurring.

3. The network spares audit, optimization, and maintenance system of claim 1, wherein the inputted conditions comprise one or more of contractual obligations, customer specified sparing algorithms, risks, risk limits, costs, cost limits, Mean Time to Breakdown data, Mean Time to Replace data, fault data, repair data, service interruption data, and network growth predictions.

4. The network spares audit, optimization, and maintenance system of claim 1, wherein the application monitors the one or more networks for configuration changes and, if detected, updates its statistical analysis.

5. The network spares audit, optimization, and maintenance system of claim 1, wherein the equipment of the one or more networks is each mapped to one or more spares depots.

6. The network spares audit, optimization, and maintenance system of claim 1, wherein the mapping algorithm is operable to highlight any of the equipment that is not mapped to a spares depot.

7. The network spares audit, optimization, and maintenance system of claim 1, wherein the probabilistic risk analysis algorithm is operable to indicate a confidence interval within which a risk evaluation falls based on a standard deviation of one or more of Mean Time to Breakdown data and Mean Time to Replace data.

8. A network spares audit, optimization, and maintenance method, comprising:
executing an application on a processor associated with one of (1) a network management system of a network and (2) a logistics management tool external to the network and in communication with the network management system of the network, wherein the network management system performs network discovery and provides the application with live network data related to equipment present at each site in the network in real time, the application comprising:
a probabilistic risk analysis algorithm executed by the application and operable to utilize statistical analysis to determine how many and what types of spares are required at each of one or more spares depots based on inputted conditions, the live network data, and network configuration information; and a mapping algorithm operable to map the equipment of the network to the one or more spares depots, and wherein the equipment is mapped to the one or more spares depots by first mapping the equipment to sites and then mapping the sites to the one or more spares depots;

wherein the application is configured to provide one or more of a notification of new spares requirements and an assessment of risks based on newly added equipment detected in the live network data.

9. The network spares audit, optimization, and maintenance method of claim 8, wherein the application compares actual spares levels in the spares depots to required spares levels in the spares depots and flags any discrepancies prior to a fault occurring.

10. The network spares audit, optimization, and maintenance method of claim 8, wherein the inputted conditions comprise one or more of contractual obligations, customer specified sparing algorithms, risks, risk limits, costs, cost limits, Mean Time to Breakdown data, Mean Time to Replace data, fault data, repair data, service interruption data, and network growth predictions.

11. The network spares audit, optimization, and maintenance method of claim 8, wherein the application monitors the one or more networks for configuration changes and, if detected, updates its statistical analysis.

12. The network spares audit, optimization, and maintenance method of claim 8, wherein the equipment of the one or more networks is each mapped to one or more spares depots.

13. The network spares audit, optimization, and maintenance method of claim 8, wherein the mapping algorithm is operable to highlight any of the equipment that is not mapped to a spares depot.

14. The network spares audit, optimization, and maintenance method of claim 8, wherein the probabilistic risk analysis algorithm is operable to indicate a confidence interval within which a risk evaluation falls based on a standard deviation of one or more of Mean Time to Breakdown data and Mean Time to Replace data.

15. A network management system of a network, comprising:

a processor executing a network spares audit, optimization, and maintenance application, the network spares audit, optimization, and maintenance application comprising:

a probabilistic risk analysis algorithm executed by the application and operable to utilize statistical analysis to determine how many and what types of spares are required at each of one or more spares depots based on inputted conditions; and a mapping algorithm operable to map equipment of the network to the one or more spares depots, and wherein the equipment of the network is mapped to the one or more spares depots by first mapping the equipment to sites and then mapping the sites to the one or more spares depots;

wherein the network management system performs network discovery and provides the application with live network data related to equipment present at each site in the network in real time;

wherein operation and output of the application is dynamically updated based on network configuration information automatically received by the network management system of the network;

wherein the network management system of the network is in communication with a logistics management tool external to the network; and wherein the application is configured to provide one or more of a notification of new spares requirements and an assessment of risks based on newly added equipment detected in the live network data.

16. The network management system of claim 15, wherein the application compares actual spares levels in the spares depots to required spares levels in the spares depots and flags any discrepancies prior to a fault occurring.

17. The network management system of claim 15, wherein the inputted conditions comprise one or more of contractual obligations, customer specified sparing algorithms, risks, risk limits, costs, cost limits, Mean Time to Breakdown data, Mean Time to Replace data, fault data, repair data, service interruption data, and network growth predictions.

18. The network management system of claim 15, wherein the application monitors the one or more networks for configuration changes and, if detected, updates its statistical analysis.

19. The network management system of claim 15, wherein the equipment of the one or more networks is each mapped to one or more spares depots.

* * * * *